United States Patent
Kay et al.

(10) Patent No.: US 10,443,509 B2
(45) Date of Patent: Oct. 15, 2019

(54) SYSTEM AND METHOD FOR TURBOMACHINERY VANE PROGNOSTICS AND DIAGNOSTICS

(71) Applicant: General Electric Company, Schenectady, NY (US)

(72) Inventors: Cyron Frank Kay, Saint Augustine, FL (US); John Carver Maters, Taylors, SC (US)

(73) Assignee: General Electric Company, Schenectady, NY (US)

( * ) Notice: Subject to any disclaimer, the term of this patent is extended or adjusted under 35 U.S.C. 154(b) by 479 days.

(21) Appl. No.: 14/530,109

(22) Filed: Oct. 31, 2014

(65) Prior Publication Data

US 2016/0123238 A1 May 5, 2016

(51) Int. Cl.
*F02C 9/20* (2006.01)
*F01D 9/04* (2006.01)
(Continued)

(52) U.S. Cl.
CPC ............... *F02C 9/20* (2013.01); *F01D 9/041* (2013.01); *F01D 17/04* (2013.01); *F01D 17/085* (2013.01); *F01D 17/162* (2013.01); *F01D 21/12* (2013.01); *F01D 21/14* (2013.01); *F05D 2220/3216* (2013.01); *F05D 2260/80* (2013.01); *F05D 2270/11* (2013.01); *F05D 2270/44* (2013.01);
(Continued)

(58) Field of Classification Search
CPC ...................................................... F01D 21/14
See application file for complete search history.

(56) References Cited

U.S. PATENT DOCUMENTS 5,239,874 A * 8/1993 Hale ..................... G01L 5/0061
324/765.01
5,893,047 A * 4/1999 Gimblett ............ G05B 19/0428
700/130
(Continued)

OTHER PUBLICATIONS

Grazma, Ron. "Unlocking the Keys to Longer Life for Gas Power Generation Turbines." Moving Your World: Ideas in Motion from MOOG Industrial. Dec. 2010 retreived from http://www.moog.com/literature/ICD/moogindustrialnewsletterissue24.pdf on Dec. 8, 2016.*

(Continued)

*Primary Examiner* — Richard A Edgar
*Assistant Examiner* — Topaz L. Elliott
(74) *Attorney, Agent, or Firm* — Fletcher Yoder, P.C.

(57) ABSTRACT

One embodiment includes a system including an actuation system of a gas turbine system including an actuator, a positioner including one or more sensors, a motor, and a controller communicably coupled to the positioner and the motor. The actuator is coupled to one or more inlet guide vanes (IGVs) or variable stator vanes (VSVs) and configured to move the IGVs or VSVs, the positioner is configured to position the actuator so that the actuator moves the IGVs or VSVs to a desired angle, the motor is configured to drive the actuator, and the controller is configured to establish one or more baselines for one or more types of data obtained by the sensors at initialization of the gas turbine system, derive a deviation from the baselines, and perform a preventative action if a deviation that meets or exceeds a threshold is derived.

20 Claims, 4 Drawing Sheets

(51) Int. Cl.
*F01D 17/08* (2006.01)
*F01D 17/04* (2006.01)
*F01D 21/12* (2006.01)
*F01D 21/14* (2006.01)
*F01D 17/16* (2006.01)

(52) U.S. Cl.
CPC ...... *F05D 2270/54* (2013.01); *F05D 2270/62* (2013.01)

(56) References Cited

U.S. PATENT DOCUMENTS

| | | | |
|---|---|---|---|
| 6,722,845 B2 | 4/2004 | Chard et al. | |
| 7,039,554 B2* | 5/2006 | Nguyen | G05B 23/0221 702/179 |
| 7,096,657 B2 | 8/2006 | Mahoney et al. | |
| 7,211,982 B1 | 5/2007 | Chang et al. | |
| 7,283,934 B2* | 10/2007 | Deller | B64F 5/0045 702/183 |
| 7,292,954 B2* | 11/2007 | Deller | B64F 5/0045 702/115 |
| 7,457,785 B1* | 11/2008 | Greitzer | G01D 1/18 706/12 |
| 7,574,324 B2 | 8/2009 | Ueno | |
| 8,240,223 B2* | 8/2012 | Jones | B64C 13/28 244/110 B |
| 8,275,507 B2* | 9/2012 | Bader | F02K 1/76 60/226.2 |
| 9,068,470 B2 | 6/2015 | Mills et al. | |
| 9,092,030 B2 | 7/2015 | Weiss et al. | |
| 2005/0147492 A1 | 7/2005 | Mahooney et al. | |
| 2006/0029494 A1* | 2/2006 | Bruce | F01D 5/288 415/160 |
| 2006/0047403 A1* | 3/2006 | Volponi | F01D 17/02 701/100 |
| 2007/0050115 A1 | 3/2007 | Discenzo et al. | |
| 2008/0258560 A1 | 10/2008 | Dubois et al. | |
| 2009/0064655 A1 | 3/2009 | Regunath | |
| 2009/0123272 A1 | 5/2009 | Love et al. | |
| 2010/0300816 A1* | 12/2010 | Linke | F16D 66/025 188/1.11 L |
| 2011/0119032 A1* | 5/2011 | Liu | G05B 23/0221 702/183 |
| 2013/0338898 A1 | 12/2013 | Aurousseau et al. | |
| 2014/0169948 A1 | 6/2014 | Kay et al. | |
| 2014/0199157 A1* | 7/2014 | Haerms | F01D 21/06 415/1 |
| 2016/0032703 A1 | 2/2016 | Broussard et al. | |
| 2016/0123238 A1 | 5/2016 | Kay et al. | |
| 2016/0222890 A1 | 8/2016 | Luehrsen et al. | |
| 2017/0089258 A1 | 3/2017 | Ritter et al. | |

OTHER PUBLICATIONS

Man Deisel and Turbo, "Guide Vane actuating Unit, Retrofit for isotherm turbocomrpessors" accessed from https://primeserv.man-es.com/docs/librariesprovider5/primeserv-turbo/guide-vane-actuating-unit-isotherm-compressors.pdf?sfvrsn=f2a259a2_6 on Dec. 31, 2018 (Year: 2018).*

Azbil, "Control Valves and Actuators" accessed from "https://www.azbil.com/products/factory/factory-product/control-valve-actuator/index.html" on Dec. 31, 2018 (Year: 2018).*

Allied Valve, Inc. "What is a Digital Positioner and Why Should You Use One?" accessed from https://alliedvalveinc.com/the-valve-expert/digital-positioner-use-one/ on Dec. 31, 2018. (Year: 2018).*

* cited by examiner

SYSTEM AND METHOD FOR TURBOMACHINERY VANE PROGNOSTICS AND DIAGNOSTICS

BACKGROUND

The subject matter disclosed herein relates to turbomachinery, and more specifically, to a system and method for inlet guide vane and variable stator vane actuation system prognostics and diagnostics.

Certain turbomachinery, such as gas turbine systems, generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. The flow and pressure of the fluids into the compressor or turbine may be modified by utilizing a vane actuation system in the gas turbine system. However, the vane actuation system and other components of the gas turbine system may experience wear and tear during use. It would be beneficial to improve prognostic and diagnostics for turbomachinery vane systems.

BRIEF DESCRIPTION

Certain embodiments commensurate in scope with the present disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system is disclosed. The system includes an actuation system of a gas turbine system including an actuator, a positioner including one or more sensors, a motor, and a controller system communicably coupled to the positioner and the motor. The actuator is coupled to one or more inlet guide vanes (IGVs) or variable stator vanes (VSVs) and configured to move the IGVs or VSVs, the positioner is configured to position the actuator so that the actuator moves the IGVs or VSVs to a desired angle, the motor is configured to drive the actuator, and the controller system is configured to establish one or more baselines for one or more types of data obtained by the sensors at initialization of the gas turbine system, derive a deviation from the baselines, and perform a preventative action if a deviation that meets or exceeds a threshold is derived.

In a second embodiment, a method is disclosed. The method includes establishing, via a controller of a gas turbine system, one or more baselines for data obtained by one or more sensors included in a turbine vane actuation system configured to actuate inlet guide vanes (IGVs) or variable stator vanes (VSVs) of the gas turbine system when the gas turbine system is initialized, deriving, via the controller, a deviation from the baselines during operation of the gas turbine system, and performing, via the controller, a preventative action if a deviation is derived.

In a third embodiment, a non-transitory, computer-readable medium having instructions stored thereon is disclosed. The instructions are configured to cause a processor to establish one or more baselines for data obtained by sensors included in a turbine vane actuation system configured to actuate inlet guide vanes (IGVs) and variable stator vanes (VSVs) of the gas turbine system when the gas turbine system is initialized, derive a deviation from the baselines during operation of the gas turbine system, and perform a preventative action if a deviation is derived.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
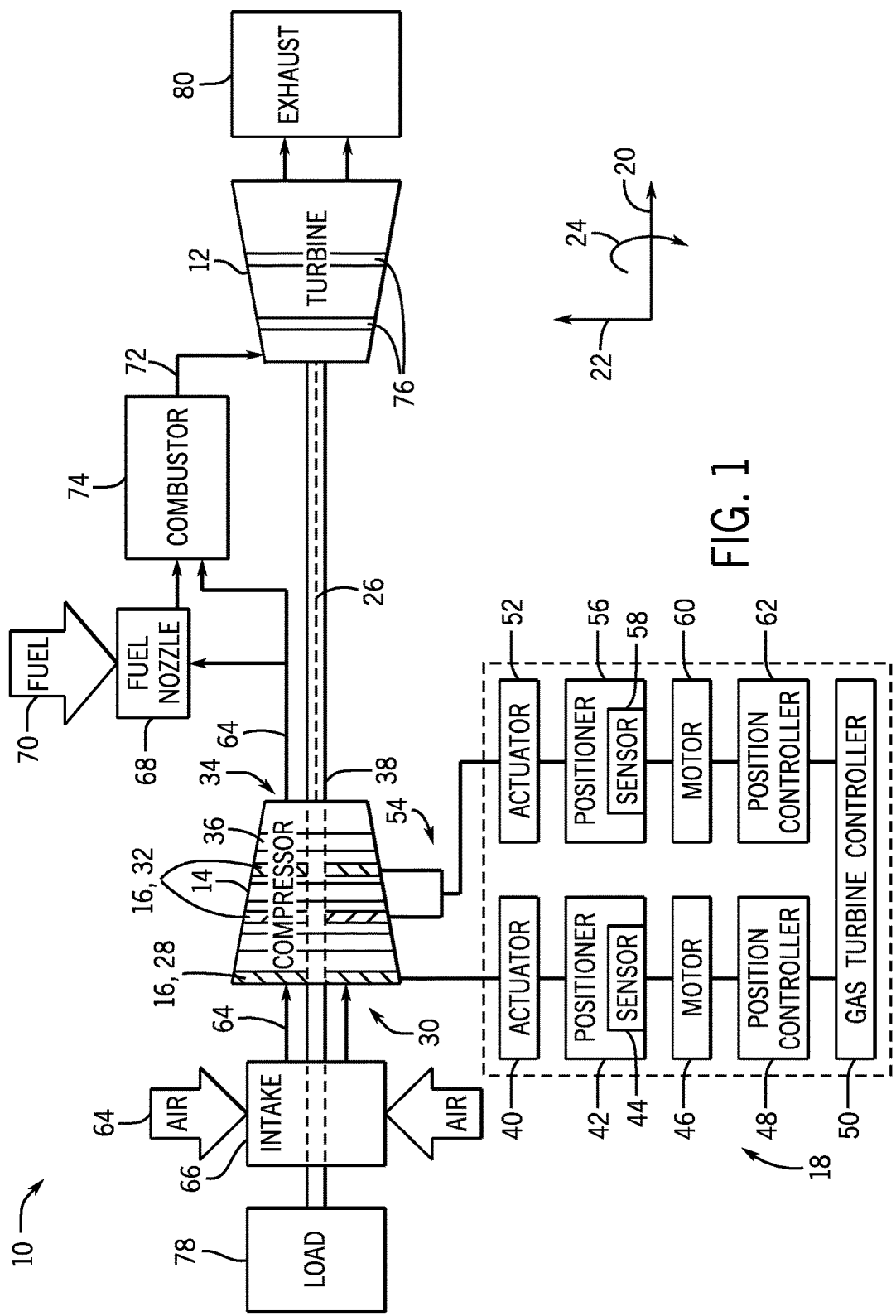
FIG. 1 is a schematic diagram of an embodiment of a gas turbine system having a compressor equipped with vanes and an actuation system to control the vanes.

The disclosure of U.S. patent application Ser. No. 13/721,000, entitled "System for Turbomachine Vane Control," filed Dec. 19, 2012 is herein incorporated by reference in its entirety.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As mentioned above, various components of a gas turbine system may experience degradation as a result of use. For example, several components that may experience degradation include an inlet guide vane (IGV) and a variable stator vane (VSV) actuation system. The IGV and VSV actuation system may change the incident angle of the IGVs and VSVs by utilizing dual, symmetrical actuators positioned on opposite sides of a gas turbine. The actuators may experience dynamic and static forces and thermal changes, among other things, during operation. If the components are not properly maintained, the degradation factors may cause undesired maintenance events. Thus, it may be desirable to monitor the degradation factors to predict when maintenance may be required on the system.

Accordingly, embodiments of the present disclosure relate to providing real time and historical trending data on the health of the gas turbine IGV and VSV actuation system that may be used to predict when maintenance should be performed on the system, and/or to detect an undesired maintenance condition. In an embodiment, the IGV and VSV actuation system may include dual electric digital positioners that monitor usage characteristics of the dual actuators via sensors during operation. A turbine master controller may communicate with the dual positioners to transmit position commands and parameter settings, and to receive position feedback and diagnostic data over a communication bus. In some embodiments, the communication bus may be dual and the bus may or may not be redundant.

For example, the positioners may continuously monitor the dynamic and static forces of the actuators by utilizing a sensor to obtain trending real time data relating, for example, to the current or amperage required to position the actuators to the commanded position. Accordingly, the sensor may be a non-invasive current or amperage sensor suitable for transmitting a signal representative of the current used by the positioner(s). Further, the positioners may continuously monitor their own internal temperature and the internal temperature of each actuator assembly by utilizing a temperature sensor. Then, the obtained usage characteristics (e.g., current, thermal, force used, friction, vibration data) may be compared to a determined performance baseline for any deviations. If a threshold deviation has been met or exceeded, one or more actions may be taken, such as shutting down the gas turbine system, triggering an alarm, sending an alert, generating a maintenance schedule, and so forth. The present disclosure applies system diagnostics and prognostics for dual IGV and VSV actuation system during gas turbine system operation. As may be appreciated, the techniques disclosed may enable improved and informed maintenance planning and operation scheduling advantages and potential for reduced turbine system forced outages and down time. Commercially, this may add value for a gas turbine operator with potential for improved gas turbine system reliability.

Turning now to the figures, FIG. 1 illustrates a block diagram of an embodiment of a gas turbine system 10 having a turbine 12 suitable for combusting a carbonaceous fuel to produce a rotative power. Also shown is a compressor 14 equipped with vanes 16 that may be adjusted by an actuation system 18. Throughout the discussion, a set of axes will be referenced. These axes are based on a cylindrical coordinate system and point in an axial direction 20, a radial direction 22, and a circumferential direction 24. For example, the axial direction 20 extends along a longitudinal axis 26 of the gas turbine system 10, the radial direction 22 extends away from the longitudinal axis 26, and the circumferential direction 24 extends around the longitudinal axis 26. Furthermore, it should be noted that a variety of rotary equipment, such as compressors 14, turbines 12, pumps, and/or the like, may benefit from the adjustable vanes 16 and the actuation system 18.

As shown, the compressor 14 includes multiple stages of the vanes 16 disposed at various positions along the compressor 14 in the axial direction 20. More specifically, the compressor 14 includes IGVs 28 (e.g., 16) positioned at an inlet 30 of the compressor 14, VSVs 32 (e.g., 16) disposed between the inlet 30 and an outlet 34 of the compressor 14, and rotor blades 36 disposed between the IGVs 28 and the VSVs 32. In general, the rotor blades 36 are coupled to a rotor (e.g., shaft 38) of the compressor 14, and rotate about the longitudinal axis 26 in the circumferential direction 24 during operation of the compressor 14. On the other hand, IGVs 28 and VSVs 32 are coupled to stator (e.g., stationary) components of the compressor 14, and generally do not rotate about the longitudinal axis 26.

As illustrated, the actuation system 18 is coupled to each of the IGVs 28 and the VSVs 32. However, in certain embodiments, the actuation system 18 may be coupled to only a portion of the IGVs 28 and VSVs 32. In other words, a portion of the compressor vanes 16 may have a fixed pitch or angle, whereas another portion of the compressor vanes 16 may have an adjustable pitch that is controlled by the actuation system 18. As will be described in further detail below, the actuation system 18 may include a first actuator 40 coupled to the IGVs 28, a first positioner 42 including one or more sensors 44 that positions the first actuator 40 and monitors desired usage characteristics, a first motor 46 (e.g., electric motor) that may drive the first actuator 40, a first position controller 48 that may provide signals to the first motor 46 and the first positioner 42, and a gas turbine master controller 50 that provides control signals to and receives data from the first position controller 48 and that baselines the performance of the turbine system 10 and determines deviations based on the usage characteristics, among other things. The controllers 48 and 50 may include one or more memories and one or more physical processors. The sensors 44 may include a current sensor, position sensor, thermal sensor, force sensor, vibration sensor, and so forth that provide data to the controller 50.

In a similar manner, a second actuator 52 controls each of the VSVs 32. For example, the second actuator 52 may adjust a torque tube 54 (e.g., a structure that transmits radial forces along the axial direction 20) that, in turn, adjusts each of the VSVs 32. A second positioner 56 may include one or more sensors 58 to position the second actuator 52 and monitor desired usage characteristics. Also, a second motor 60 may drive the second actuator 52, a second position controller 62 may control the second motor 60 and the second positioner 56, and the gas turbine master controller 50 may govern the operation of the second position controller 62 and detect any deviations from a determined performance baseline based on the usage characteristics. Likewise, the sensors 58 may include a current sensor, position sensor, thermal sensor, force sensor, vibration sensor, and so forth that provide data to the master controller 50. Further, the first and second position controllers 48 and 62 and the gas turbine master controller 50 may generally be referred to as a controller system. It should be appreciated that the controller system may include any number of controllers in communication with the gas turbine master controller 50.

During operation of the gas turbine system 10, it may be desirable to adjust the angle or pitch of the IGVs 28 and the VSVs 32. For example, a lower pitch of the IGVs 28 and the VSVs 32 may be more desirable during start-up operation, when flow rates and pressures are generally lower. In other words, a lower pitch at the IGVs 28 and the VSVs 32 may provide less resistance to flow as the IGVs 28 and the VSVs 32 are generally not aligned with the longitudinal axis 26. In addition, adjusting the IGVs 28 and VSVs 32 may counteract pressure and flow fluctuations that occur within the compressor 14. The IGVs 28 and VSVs 32 increase the operability of the compressor 14 and the gas turbine system 10. Operation of the gas turbine system 10 is summarized below.

An oxidant 64 flows from an intake 66 into the compressor 14, where the rotation of the compressor blades 36 compresses and pressurizes the oxidant 64. The oxidant 64 may include ambient air, pure oxygen, oxygen-enriched air, oxygen-reduced air, oxygen-nitrogen mixtures, or any suitable oxidant that facilitates combustion of fuel. The following discussion refers to air 64 as an example of the oxidant, but is intended only as a non-limiting example. The air 64 flows into a fuel nozzle 68. Within the fuel nozzle 68, fuel 70 mixes with the air 64 at a ratio suitable for combustion, emissions, fuel consumption, power output, and the like. Thereafter, a mixture of the fuel 70 and the air 64 is combusted into hot combustion products 72 within a combustor 74. The hot combustion products 72 enter the turbine 12 and force rotor blades 76 to rotate, thereby driving the shaft 38 into rotation. The rotating shaft 38 provides the energy for the compressor 14 to compress the air 64. More specifically, the rotating shaft 38 rotates the compressor blades 36 attached to the shaft 38 within the compressor 14, thereby pressurizing the air 64 that is fed to the combustor 74. Furthermore, the rotating shaft 38 may drive a load 78, such as an electrical generator or any other device capable of utilizing the mechanical energy of the shaft 38. After the turbine 12 extracts useful work from the combustion products 72, the combustion products 72 are discharged to an exhaust 80.

The actuation system 18 may aid in pressurizing the air 64 by positioning the IGVs 28 and VSVs 32 to desired incident angles. However, the actuation system 18 may degrade over time and eventually lead to undesired maintenance events if not properly maintained. Thus, in certain embodiments, the master controller 50 may predict future conditions when maintenance should be performed by analyzing diagnostic data received from the sensors 44 and 58 of the dual positioners 42 and 56 and status information received from the position controllers 48 and 62. Additionally or alternatively, the controller 50 may detect current conditions that may benefit from maintenance. To make the prediction or detection, the master controller 50 may, in certain embodiments, baseline the performance of the gas turbine system 10 at initialization of the system 10 by determining how much friction resulted from moving the respective vanes 16 (e.g., how much force required to drive the actuators 40 and/or 52, a coefficient of friction, or a combination thereof), how much current was utilized to position the actuators 40 and/or 52 to the commanded position, the temperature of actuator assemblies, or a combination thereof.

Then, as the gas turbine system 10 is operating, the positioners' sensors 44 and 58 may transmit usage characteristic data to the master controller 50, which may then derive, using various techniques described in more detail below, a deviation between the real time data and the baseline data. Further, the master controller 50 may store data received from the sensors to utilize for historical trending analysis. If the current data meets or exceeds a threshold deviation from the baseline, then the controller 50 may determine that maintenance should be performed, may shut down the gas turbine system, generate a maintenance plan, trigger an alarm, and/or send an alert, among other actions. When the gas turbine system is restarted, the process may begin again by re-baselining the system on initialization and monitoring for deviations while the system is operating. In this manner, maintenance planning may be enhanced and system down time may be reduced.

Figure 2:
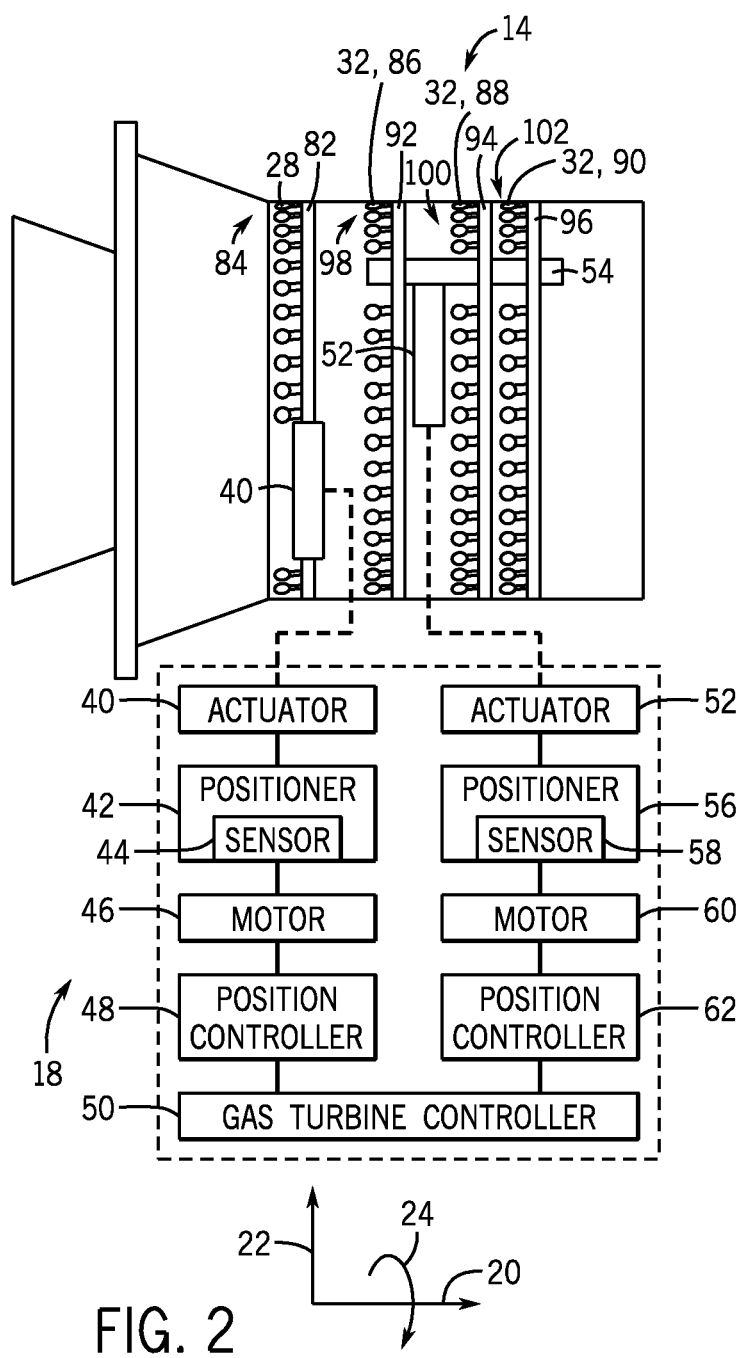
FIG. 2 is a partial cross-sectional view of an embodiment of the compressor of FIG. 1, illustrating inlet guide vanes (IGVs) and multiple sets of variable stator vanes (VSVs) adjusted by the actuation system.

FIG. 2 illustrates a partial cross-sectional view of an embodiment of the compressor 14, showing the IGVs 28 and the VSVs 32 in greater detail. Again, it should be noted that the adjustable vanes 16 may be applied to a variety of rotating equipment, such as the compressor 14, the turbine 12, or any combination thereof. As shown, the IGVs 28 are coupled to a first unison ring 82 and are positioned with a first pitch 84. The first positioner 42 may be coupled to the first actuator 40 to position the actuator 40 and monitor usage characteristics of the actuation system 18 via one or more sensors 44. The actuator 40 may move the first unison ring 82 (e.g., in the radial 22 or circumferential 24 direction), thereby moving each of the IGVs 28 in the radial 22 or circumferential 24 direction. In certain embodiments, each of the IGVs 28 may be positioned at a substantially similar pitch by the actuator 40 being positioned by positioner 42 according to commands received from the first position controller 48, which is controlled by the master controller 50. In a similar manner, first, second, and third stages 86, 88, and 90 of the VSVs 32 are coupled to respective unison rings 92, 94, and 96. The second positioner 56 may be coupled to the second actuator 52 to position the actuator 52 as desired by the second position controller 62 controlled by the master controller 50. That is, the actuator 52 may be positioned by the positioner 56 to move the torque tube 54 (e.g., in the radial 22 or circumferential 24 direction) in order to adjust each of the unison rings 92, 94, and 96 in the radial 22 or circumferential 24 direction, thereby adjusting respective pitches 98, 100, and 102 of the VSV stages 86, 88, and 90. As noted earlier, the compressor 14 may include any suitable number of VSV stages. For example, the compressor may be a single-stage compressor having a single VSV stage, a dual-stage compressor having two VSV stages, or a multi-stage compressor having 3, 4, 5, or more VSV stages.

Because the pitches 98, 100, and 102 of the VSVs 32 are adjusted collectively by the position of the torque tube 54, it may be desirable for the pitches 98, 100, and 102 to move in a predetermined ratio relative to one another. That is, a certain position of the torque tube 54 may correspond to specific pitches of the VSVs 32, and adjustment of an individual VSV pitch may affect the other VSV pitches. For example, the pitches 98 and 100 may have a constant ratio relative to one another while the torque tube 54 is adjusted. While the pitches 98 and 100 may change, their ratio may remain approximately constant during operation of the gas turbine system 10. Such a configuration enables relatively predictable operation of the gas turbine system 10. It should be noted, however, that certain embodiments may employ additional actuators to enable each of the VSV pitches 98, 100, and 102 to be adjusted independently of one another.

As shown, the IGVs 28 are adjusted by the first actuator 40 (e.g., via radial 22 or circumferential 24 movement of the first unison ring 82), whereas the VSVs 32 are collectively adjusted by the second actuator 52 (e.g., via radial 22 or circumferential 24 movement the torque tube 54). This configuration enables the first pitch 84 of the IGVs 28 to be controlled separately and independently of the VSV pitches 98, 100, and 102. For example, during start-up operation, it may be desirable to adjust the first pitch 84 of the IGVs 28 to throttle flow of the air 64 while maintaining the VSV pitches 98, 100, and 102 approximately constant. On the other hand, during steady-state or full-load operation, it may be desirable to adjust the VSV pitches 98, 100, and 102, while maintaining the first pitch 84 of the IGVs 28 approximately constant to control the outlet pressure or pressure ratio of the compressor 14. Thus, in certain configurations, the IGVs 28 may have a greater influence on the flow rate of the air 64 through the compressor 14, while the VSVs 32 may have a greater influence on the pressure profile within the compressor 14. Simultaneously controlling the IGVs 28 and VSVs 32 may enable a targeted flow and pressure profile within the compressor 14.

Although the embodiments illustrated in FIGS. 1 and 2 show a single actuation system 18 coupled to each unison ring (e.g., 82, 92, 94, and 96), multiple actuation systems may be coupled to each unison ring to improve the stability and operability of the unison rings. In general, 1, 2, 3, 4, or more actuation systems may be coupled directly or indirectly (e.g., through the torque tube 54) to each unison ring. The controller 50 may receive data via the sensors 44, 58, and may then derive certain predictive and/or diagnostic conditions based on the data. For example, dynamic and static forces related to rubs, friction, temperature changes, current flow, and/or voltage differences may be used to derive the predictive and/or diagnostic conditions, such as detection of a state of degradation of the vanes 16, actuation system 18, actuators 40, 52, torque tube 54, and related components. Various techniques may be used, including baselining, statistical techniques, filters (e.g., Kalman), neural networks, data mining, genetic algorithms, state vector machines, and so on. For example, a baseline (e.g., neural network baseline, genetic algorithm structure starting point, data mining cluster) may be first derived (or obtained from a statistical or other analysis performed by the manufacturer). Deviations from the baseline may then be observed, and the observations used to derive predictive and/or diagnostic conditions, such as detection of the state of degradation.

Figure 3:
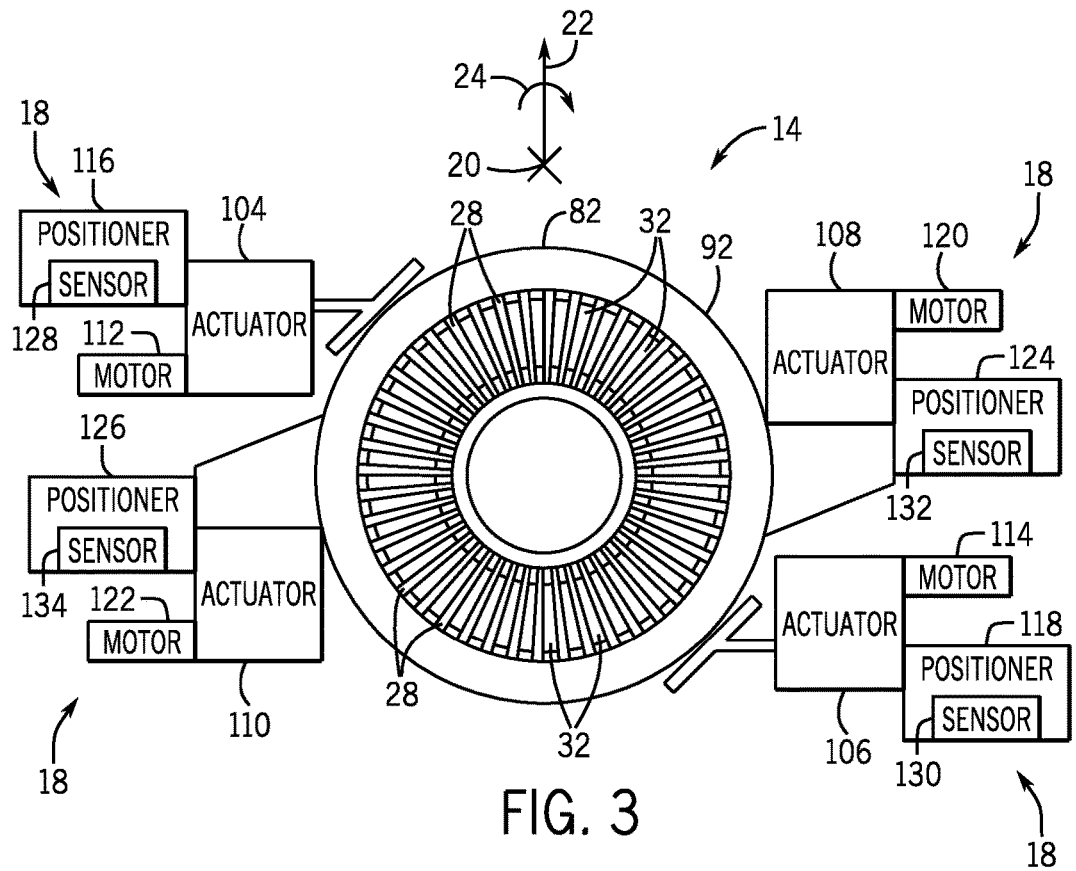
FIG. 3 is front view of an embodiment of the compressor of FIG. 1, illustrating multiple actuation systems suitable for adjusting a single set of compressor vanes in coordination with one another.

As shown in FIG. 3, the unison rings (e.g., 82, 92, 94, 96) may be coupled to two or more actuators spaced circumferentially 24 about the compressor 14. More specifically, FIG. 3 illustrates a front view of an embodiment of the compressor 14 including multiple actuation systems 18 coupled to the unison rings (e.g., 82 and 92) of the IGVs and VSVs. Specifically, IGV actuators 104 and 106 are coupled to the unison ring 92 of the IGVs 28 and VSV actuators 108 and 110 are coupled to the unison ring 82 of the VSVs 32. The IGV actuators 104 and 106 are driven by respective motors 112 and 114 and positioned by respective positioners 116 and 118, whereas the VSV actuators 108 and 110 are driven by motors 120 and 122 and positioned by positioners 124 and 126. The IGV positioners 116 and 118 include sensors 128 and 130, and the VSV positioners 124 and 126 include sensors 132 and 134. Each set of actuators (e.g., 104 and 106, 108 and 110) is spaced circumferentially 24 about the longitudinal axis 26 of the compressor 14, which enables a relatively uniform movement of the unison rings 82 and 92. It should be noted that other arrangements of the actuators 104, 106, 108, and 110, may be envisioned, depending on the physical or spatial limitations of the compressor 14. Furthermore, in embodiments with more than one actuation system, it may be desirable for the multiple actuators and/or associated components (e.g., positioner, master controller, motor) to be in communication with each other, thereby improving the operability of the actuation system 18. Indeed, the positioners' sensors may send usage characteristic data and the position controllers may send status information to the gas turbine master controller 50 so that the controller 50 may determine state of degradation and whether maintenance can be performed on any component of the actuation system 18 and/or gas turbine system 10.

Figure 4:
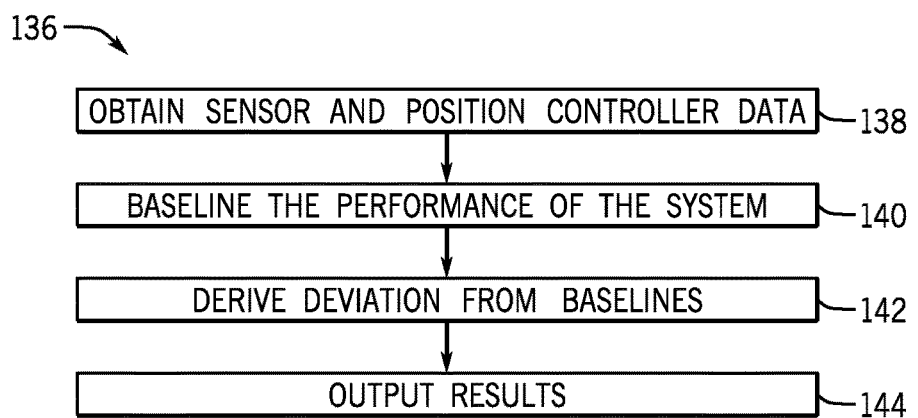
FIG. 4 is a flow diagram of an embodiment of a process suitable for obtaining a baseline performance of an IGV and VSV actuation system and for determining deviations from the baseline.

FIG. 4 is a flow diagram of an embodiment of a process 136 suitable for deriving certain predictive and/or diagnostic conditions based on the data. For example, dynamic and static forces related to rubs, friction, temperature changes, current flow, and/or voltage differences may be used to derive the predictive and/or diagnostic conditions, such as detection of a state of degradation of the vanes 16, actuation system 18, actuators 40, 52, torque tube 54, and related components. In the depicted embodiment, the process is depicted as obtaining a baseline performance of an IGV and VSV actuation system 18 and determining deviations from the baseline. As discussed above, deviations from the baseline may indicate that certain components are about to fail, which may lead to system down time and/or a forced outage. By monitoring and analyzing real time and historical data with one or more baselines, the controller 50 may be able to predict when maintenance should be performed on degrading components before they fail. This may allow scheduled down time to be planned ahead and minimized so that the gas turbine system 10 may continue operation as soon as possible. Example maintenance may include actuator re-lubrication, actuator overhaul, linkage system bushing replacement, motor insulation replacement, and so forth. As may be appreciated, identifying the degrading component and associated maintenance may enable ordering replacement parts before the component fails and scheduling an engineer to perform the maintenance during non-peak hours of operation to minimize commercial impact.

The process 136 may include obtaining data from one or more sensors and position controllers 48 and 62 included in an actuation system (process block 138), baselining the performance of the actuation system (process block 140), deriving any deviations from the baseline (process block 142), and outputting the results (process block 144). The process 136 may be implemented as computer instructions stored on one or more tangible, non-transitory computer-readable mediums and executable by one or more processors. Beginning with process block 138, the sensors that send data to the controller 50 may include a current sensor, a position sensor, a voltage sensor, a force sensor (e.g., load cell, force-sensing resistor), a thermal sensor, a vibration sensor, and so forth. The current sensor may detect how much current is utilized by the positioners to position the actuator in the commanded position, the position sensor may detect the position of the actuator, the voltage sensor may detect voltage used to position the actuator, the force sensor may detect how much force is required to drive the actuators (e.g., how much friction is overcome to move the vanes), the thermal sensor may detect the internal temperature of each actuator assembly and/or the temperature of motor drives and/or the controller 50, and the vibration sensor may detect the vibration experienced by the system. Also, the data obtained from the position controllers 48 and 62 may include status information or other diagnostics performed by the position controllers 48 and 62. As described below, the sensor data and position controller data may then be utilized by the controller 50 to determine the state of degradation of the actuation systems and other gas turbine system components and perform one or more actions accordingly.

The sensor and position controller data analyzed by the gas turbine master controller 50 when determining whether maintenance should be scheduled, among other things, be both real time (e.g., live) and/or historical trending. For real time data, the controller 50 may continuously check the recently detected data sent by a respective sensor against a baseline and derive whether the deviation meets or exceeds a threshold for that parameter. For historical trending data, the sensor data may be stored by the controller 50 for a certain amount of time. The stored sensor data may be utilized to show historical trends of degradation for certain components. For example, if the controller 50 knows how long it typically takes a certain component to fail once a certain current is used or temperature is met, then the controller 50 may be able to schedule maintenance on that component before the failure. The controller 50 may determine the length of time between the reading and failure by averaging previous components' lifespan after hitting the certain current or temperature and/or looking at other similar gas turbine system component performance.

Next, in process block 140, the process 136 includes baselining the performance of the actuation system and/or other components of the gas turbine system. A baseline may refer to a value for a usage characteristic that may be utilized as a basis for defining change. The baseline may include data obtained during system development, programming, testing, commissioning, installation, or some combination thereof. In some embodiments, statistical baselines may be used by deriving a predictive curve based on curve fitting (e.g., linear, non-linear). In other embodiments, baselines may be obtained using filtering techniques (e.g., Kalman filters by recursively operating on input data to produce a statistically enhanced estimate of the system state), neural networks (e.g., baseline a starting network and figure out how much it changes), data mining (e.g., baseline a starting cluster and determine whether the sensed data is inside or outside of the cluster), and so forth. Performance baselines may be taken at the fleet level and/or at the unit level. In an embodiment, another system including computers or controllers may perform fleet level data analytics. At the fleet level, each gas turbine system that is manufactured as a part of a certain fleet may be baselined at creation. Then, each individual gas turbine system may be compared to the group's performance baselines to determine the unit's state of degradation. Additionally, each gas turbine system's performance may be checked during operation and compared to the unit being monitored. At the unit level, each gas turbine system may baseline performance of its various components and derive deviations as described herein.

In some embodiments, a baseline may be established when a gas turbine system is initially started by obtaining the initial sensor readings and position controller data. Additionally, the baselines may be established by initializing the gas turbine system and running it without an air load to determine how much friction the actuators encounter to move the vanes without air present. Further, the baselines may be taken by actuating one actuator at a time and/or actuating both actuators at the same time. In another embodiment, one or more baselines may be established while the gas turbine system is operating. For example, the temperature of the actuator assembly may be baselined while the system is running. It should be noted that baselines may be established for each of the data that are obtained by the sensors included in the actuation systems, which may include a current baseline, a force baseline, and a thermal baseline for the actuator assembly, the motor drive, and/or the controller 50, among others.

Once the baselines are established, the controller 50 may derive deviations from the baselines during operation of the gas turbine systems (process block 142). The controller 50 may utilize a number of methods to derive deviations from the baselines. In most embodiments, the controller 50 may utilize data obtained from the various sensors and position controllers 48 and 62 while the gas turbine system 10 is operating for the controller's deviation analysis. In an embodiment, the deviation derivation methods may include comparing the obtained sensor and position controller data against the baselines for the respective data. If the sensor data reading or position controller data is higher or lower than the baseline by a certain threshold, then the controller 50 may determine that maintenance should be performed. For example, if the current required to position the actuators increases from the baseline by a percentage (e.g., 30%) or the current is within a certain range, then the positioner component may be degrading because it is drawing too much current and/or the actuator assembly may need re-lubrication because it is becoming more resistive to positioning. Further, if the thermal sensor for the actuator assembly detects a temperature that is too high, then the motor may be using more force than needed and maintenance may be performed. Also, if the amount of friction increases and causes the actuator difficulty when moving the vanes or being positioned by the positioner, then one or more system components may be degraded (e.g., the motor may be using force inefficiently).

In other embodiments, where neural networks are used as a baselining method, the starting network may be monitored to determine how much it changes as new sensor readings are input. If the starting network varies over a threshold amount in view of the subsequent sensor readings, then a deviation may be derived. Further, in some embodiments, where data mining is used as a baselining method, a starting cluster may be obtained and analyzed to determine whether sensor readings and position controller data are inside or outside of the cluster. If the sensor readings or position controller data are outside of the cluster, then a deviation may be derived and the controller 50 may determine that maintenance should be performed. In an embodiment where filters (e.g., Kalman) are used, the state of performance may be baselined using sensor readings and position controller data on system initialization, the state may be updated as the system runs based on the noisy input from the sensors, and sufficient deviations may be derived based on the sensor readings while the system is running. In other embodiments, the deviation derivation methods may include utilizing genetic algorithms, artificial intelligence (AI), such as fuzzy logic, mathematical techniques including statistics, or the like. In embodiments where statistical baselining is used, the deviation derivation method may include fitting sensor readings and position controller data against a baselined curve (e.g., linearly, non-linearly) to determine whether the new curve including the sensor readings and position controller data sufficiently deviates from the baselined curve. If the new curve deviates sufficiently from the baselined curve, then a deviation may be derived. These techniques may be utilized at the unit level or the fleet level to derive deviations, if present.

At the unit level, the controller 50 may obtain sensor data and position controller data during operation at a certain interval and utilize one of the above techniques to derive a deviation from the baseline for the system being monitored. At the fleet level, the baselines for multiple gas turbine systems 10 of a certain model may be stored in one or more memories and the data obtained from the sensors for each of the systems in the fleet during operation may also be stored in the one or more memories. This may enable utilizing one of the techniques described above to derive a deviation for a specific unit by analyzing the unit's performance data against the other units' performance data in the fleet.

Further, as previously noted, the sensor data may be utilized in real time analysis or in historical trending analysis. For real time analysis, the controller 50 may continuously utilize the most recent sensor data readings and position controller data to derive any deviations from the baselines with one of the above described techniques. For historical trending analysis, the controller 50 may store the obtained sensor data and position controller data for a period of time and derive deviations by utilizing any of the above described techniques. For example, the controller 50 may store the sensor and position controller data obtained from the time the gas turbine system is started to the time that it is turned off. The controller 50 may do this over the course of several operations until it is able to decipher a historical trend of performance for various components. Utilizing one of the techniques above, for example, comparing the recently obtained sensor or position controller data to the historical trend, the controller 50 may derive a deviation and be able to determine when a component is degrading and schedule maintenance accordingly. It should be noted that if a deviation is not derived and the system 10 is shut down, the process of initializing the gas turbine system 10, obtaining sensor data, baselining the performance of the system, and deriving deviations from the baselines may be performed the next time the system is started.

If a deviation from the baseline is derived for any sensor data, the controller 50 may output the results (process block 144). Additionally, the controller 50 may shut the system down depending on the deviation that is derived and the component that is degrading. In some embodiments, the controller 50 may generate a maintenance plan to service the component for which a deviation is derived. For example, if the deviation derived shows the friction for the actuator to actuate is too high, then the controller 50 may schedule actuator re-lubrication or an actuator overhaul. In some embodiments, the controller 50 may schedule the maintenance date by default, such as the next business day. In other embodiments, the controller 50 may analyze the historical trending data obtained from other gas turbine systems 10 that derived a similar deviation to determine how long until the component fails once the deviation is present. Then, the controller 50 may schedule the maintenance date before that period of time expires in order to avoid a unit failure or forced outage. The maintenance plan generated may include the component to service, the type of maintenance to perform, a date and time to perform the maintenance, the engineer to perform the maintenance, and so forth.

In addition, when a deviation is derived, the controller 50 may trigger an alert (e.g., email) to certain interested parties, such as system operators, engineers, and the like. Also, the controller 50 may trigger an alarm when the deviation is detected. For example, the alarm may be a light that flashes red on the gas turbine system 10 itself or an audible and visual alarm that flashes on a monitor in a control room of a plant, and so forth. Further, depending on the type of deviation that is derived and the component that is degrading, the controller 50 may provide the system operator with operating options. That is, there may be a number of failure modes. For example, if the controller 50 determines that failure is about to occur, the controller 50 may cause a control monitor to warn the operator of the condition but still allow the operator to start the system. On the other hand, if the controller 50 determines that failure is imminent and the component that is degrading will cause a great deal of damage to the overall system, then the controller 50 may not allow the system to be started until maintenance is performed.

Figure 5:
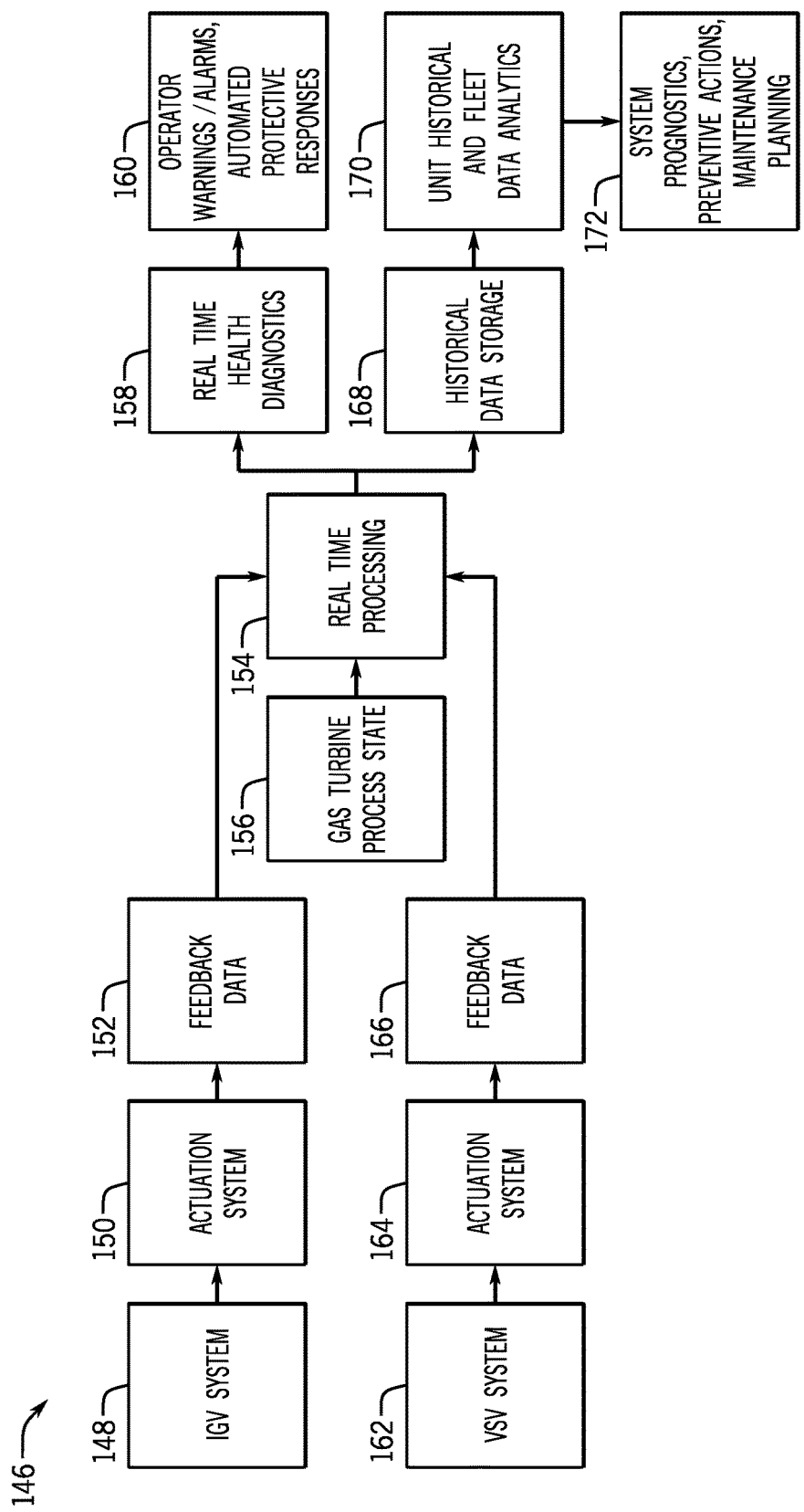
FIG. 5 is a block diagram of an embodiment of a maintenance prognostic system that may utilize the process of FIG. 4.

FIG. 5 is a block diagram of an embodiment of a maintenance prognostic and diagnostic system 146 that may execute the process 136 of FIG. 4. The maintenance prognostic and diagnostic system 146 may be a part of a gas turbine system 10 and/or may include subsystems and components of the gas turbine 10. The maintenance prognostic and diagnostic system 146 may include an IGV system 148 that includes an actuation system 150. As noted above, the actuation system 150 may include an actuator, a positioner with one or more sensors, a motor, and a master controller in communication with the positioner and the motor. The sensors of the actuation system 150 may obtain feedback data 152 related to current (e.g., amperage applied during actuation), voltage (voltage applied during actuation) temperature (e.g., thermal), position (e.g., force, voltage and current required to position the actuator), and load (e.g., the friction produced by the air). Also, position controller data may be obtained by the actuation system 150. The sensor and position controller data may be continuously obtained or obtained at a certain interval for real time processing 154 by the controller 50. The controller 50 may take into account the gas turbine system process state 156 that the system is in when the sensor data is obtained during its real time processing 154. The controller 50 may utilize one or more of the techniques described above, such as comparing the sensor data to an established baseline, to perform real time health diagnostics 158 on the system. That is, the controller 50 may determine a state of degradation of a component by deriving a deviation from the baseline while the system is operating. If a deviation is detected, the system 146 may perform machine protective actions (e.g., shut down the system, trigger alert/alarm and operator warnings, generate a maintenance schedule) and output diagnostic data of operation for the system (e.g., failure mode operating options) 160.

Additionally, the maintenance prognostic and diagnostic system 146 may include a VSV system 162 that includes an actuation system 164. Similar to the IGV's actuation system 150, the VSV's actuation system 164 may include an actuator, a positioner with one or more sensors, a motor, a position controller in communication with the motor and the positioner, and a master controller in communication the position controller, as well as the IGV's position controller. As discussed above, the position controllers and the gas turbine master controller may make up the controller system. The sensors of the actuation system 164 may obtain feedback data 166 related to current (e.g., amperage applied during actuation), voltage (voltage applied during actuation), temperature (e.g., thermal), position (e.g., force and current required to position the actuator), and load (e.g., the friction produced by the air). The data may be stored in a data storage 168 that may be an article of manufacture (e.g., memory) that is a non-transitory, computer-readable medium. Further, the gas turbine system process state 156 that the system is in when the sensor data is obtained may be stored in the data storage 168 so the controller 50 may account for the process state 156 when performing its diagnosis and prognosis. The data storage 168 may enable historical trending analysis by the controller 50 establishing trends for when certain components fail after threshold readings are obtained by the sensors. Historical trending data analysis at the unit level and fleet level 170 may be utilized for diagnosis and prognosis of the IGV and/or VSV system. This may further enable prognostics of the system health degradation and trending for the controller 50 to perform preventative actions, maintenance planning activities 172 before any failure or forced outage occurs.

Technical effects of the disclosure include inhibiting gas turbine system failure and/or reducing system downtime by determining the state of degradation of system components and taking appropriate actions. In one embodiment, dual, redundant electric positioners may monitor real time and historical trending data related to actuators in an IGV and VSV actuation system. The positioners may include sensors, such as position sensors, current sensors, force sensors, thermal sensors, vibration sensors, and so forth that send data to a controller. The controller may establish a baseline for each type of data and derive deviations from the baselines during operation of the gas turbine system. If deviations are detected, and the deviations meet or exceed certain thresholds, then the controller may schedule maintenance on the degraded component, trigger an alert/alarm, shut down the gas turbine system, provide an operator with failure operating modes, among other things.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an actuation system of a gas turbine system comprising an actuator, a positioner comprising a device including one or more sensors, a motor, and a controller system communicably coupled to the positioner and the motor, wherein the actuator is coupled to one or more inlet guide vanes (IGVs) or variable stator vanes (VSVs) and configured to move the IGVs or VSVs, the positioner is configured to move the actuator so that the actuator moves the IGVs or VSVs to a desired angle, the motor is configured to drive the actuator, and the controller system is configured to:
establish one or more baselines for one or more types of data obtained by the sensors at initialization of the gas turbine system;
monitor the positioner to derive a degradation of the IGVs, the VSVs, or a combination thereof by comparing operation data to at least one of the one or more baselines; and
perform a preventative action if a deviation that meets or exceeds a threshold is derived.

2. The system of claim 1, wherein the controller system comprises a position controller and a gas turbine controller, wherein the gas turbine controller is communicatively coupled to the position controller, wherein the controller is configured to derive the deviation from the baselines by comparing data obtained by the sensors during operation of the gas turbine system and status information from the position controller with the baselines and determining whether the operation data deviates from the baselines by the threshold, and wherein the position controller is communicably coupled to the positioner and the motor and is configured to control the positioner and the motor based on communications with the gas turbine controller.

3. The system of claim 1, wherein the one or more baselines comprise a performance baseline, a statistical baseline, a neural network, a genetic algorithm, a data mining cluster, or some combination thereof.

4. The system of claim 3, wherein the preventative action comprises generating a maintenance plan, triggering an alert, triggering an alarm, providing one or more failure operation modes, or some combination thereof.

5. The system of claim 1, wherein the sensors included in the positioner comprise a position sensor, a current sensor, a voltage sensor, a thermal sensor, a force sensor, and a vibration sensor.

6. The system of claim 1, wherein the deviation correlates to a state of degradation of a component.

7. The system of claim 1, wherein the controller system is configured to derive the deviation from the baselines by comparing real time data and historical trending data obtained by the sensors to the baselines.

8. The system of claim 1, wherein the one or more baselines comprise data obtained during system development, programming, testing, commissioning, installation, or some combination thereof.

9. The system of claim 1, wherein the controller system is configured to establish the one or more baselines by using data obtained via the sensors and status information provided by a position controller and the baselines are established at the unit level and at the fleet level.

10. The system of claim 1, wherein the controller system is configured to update the one or more baselines from data received via the sensors on subsequent initializations of the gas turbine system if a deviation is not derived during the previous operation of the gas turbine system.

11. A method, comprising:
establishing, via a controller of a gas turbine system, one or more baselines for data obtained by one or more sensors included in a turbine vane actuation system configured to actuate, via one or more actuators, each actuator of the one or more actuators moved via a positioner comprising a device configured to move the actuator, inlet guide vanes (IGVs) or variable stator vanes (VSVs) of the gas turbine system when the gas turbine system is initialized;
monitoring the positioner of the one or more actuators of the vane actuation system to derive a degradation of the IGVs, the VSVs, or a combination thereof by comparing operation data to at least one of the one or more baselines;
and
performing, via the controller, a preventative action if a deviation is derived.

12. The method of claim 11, wherein comparing the at least two of the one or more baselines comprises comparing the operation data to the at least one of the one or more baselines, and determining whether the operation data deviates from the at least one of the one or more baselines by a threshold amount.

13. The method of claim 11, wherein the one or more baselines comprise a performance baseline, a statistical baseline, a neural network, a genetic algorithm, a data mining cluster, or some combination thereof.

14. The method of claim 11, wherein performing the preventative action if a deviation is derived comprises shutting down the gas turbine system, generating a maintenance plan for a component associated with the deviation, triggering an alarm, triggering an alert, providing one or more failure operating mode options, or some combination thereof.

15. The method of claim 11, wherein deriving a deviation from the baselines comprises analyzing live and historical trending data obtained from the sensors to schedule maintenance on one or more components of the gas turbine system.

16. The method of claim 11, wherein the sensors are included in two, redundant electric positioners of the actuation system and the sensors continuously monitor current, voltage, or some combination thereof, used by the positioners to position two actuators of the actuation system, an internal temperature of the two actuators, dynamic and static forces of the two actuators, or some combination thereof.

17. A non-transitory, computer-readable medium having instructions stored thereon, wherein the instructions are configured to cause a processor to:
 establish one or more baselines for data obtained by sensors included in a turbine vane actuation system configured to actuate, via one or more actuators, each actuator of the one or more actuators moved via a positioner comprising a device configured to move the actuator, inlet guide vanes (IGVs) and variable stator vanes (VSVs) of the gas turbine system when the gas turbine system is initialized;
 monitor the positioner of the one or more actuators of the turbine vane actuation system to derive a degradation of the IGVs, the VSVs, or a combination thereof by comparing operation data to at least one of the one or more baselines;
 and
 perform a preventative action if a deviation is derived.

18. The computer-readable medium of claim 17, wherein the instructions are configured to derive the degradation by comparing the operation data to the at least one or more of the baselines via a deviation from the baselines by utilizing one or more techniques comprising linearly fitting obtained data from the sensors during operation of the gas turbine system with the baseline, neural networks, genetic algorithms, artificial intelligence, fuzzy logic, mathematical techniques including statistics, data mining, filters, or some combination thereof.

19. The computer-readable medium of claim 17, wherein the preventative action comprises shutting the gas turbine system down, generating a maintenance plan for a component associated with the deviation, triggering an alarm, triggering an alert, providing failure operating mode options, or some combination thereof.

20. The computer-readable medium of claim 17, wherein the data utilized to establish the baseline comprises a force to drive dual actuators of the actuation system, a current utilized by dual positioners of the actuation system to position the actuators, a temperature of the actuators' assemblies, a controller temperature, a motor drives temperature, or some combination thereof.

* * * * *